United States Patent
Malkes et al.

(10) Patent No.: US 11,164,128 B2
(45) Date of Patent: Nov. 2, 2021

(54) OPTIMIZING EMERGENCY SERVICES LOGISTICS USING DATA FROM A SMART TRAFFIC CONTROL SYSTEM

(71) Applicant: Cubic Corporation, San Diego, CA (US)

(72) Inventors: William A. Malkes, Knoxville, TN (US); William S. Overstreet, Knoxville, TN (US); Jeffery R. Price, Knoxville, TN (US); Michael J. Tourville, Lenoir City, TN (US)

(73) Assignee: Cubic Corporation, San Diego, CA (US)

( * ) Notice: Subject to any disclaimer, the term of this patent is extended or adjusted under 35 U.S.C. 154(b) by 18 days.

(21) Appl. No.: 16/395,878

(22) Filed: Apr. 26, 2019

(65) Prior Publication Data

US 2019/0333179 A1    Oct. 31, 2019

Related U.S. Application Data

(60) Provisional application No. 62/664,017, filed on Apr. 27, 2018.

(51) Int. Cl.
*G06Q 10/00*    (2012.01)
*G06Q 10/06*    (2012.01)
*G06Q 50/26*    (2012.01)
*G08G 1/087*    (2006.01)
*G08G 1/00*    (2006.01)

(52) U.S. Cl.
CPC ..... *G06Q 10/06315* (2013.01); *G06Q 50/265* (2013.01); *G08G 1/087* (2013.01); *G08G 1/202* (2013.01)

(58) Field of Classification Search
CPC .......... G06Q 50/265; G06Q 10/06315; G08G 1/087; G08G 1/202
See application file for complete search history.

(56) References Cited

U.S. PATENT DOCUMENTS

| 6,058,370 A | 5/2000 | Church et al. |
|---|---|---|
| 6,615,130 B2 | 9/2003 | Myr |
| 8,103,435 B2 | 1/2012 | Yang et al. |
| 8,645,176 B2 | 2/2014 | Walton et al. |
| 10,636,299 B2 * | 4/2020 | Malkes ............... G08G 1/08 |

(Continued)

OTHER PUBLICATIONS

Yang, Saini. "Integrated Management of Emergency Vehicle Fleet." University of Maryland, College Park, 2006. Ann Arbor: ProQuest. Web. Mar. 10, 2021. (Year: 2006).*

*Primary Examiner* — William S Brockington, III
(74) *Attorney, Agent, or Firm* — Kilpatrick Townsend & Stockton, LLP (57) ABSTRACT

A method of determining optimal location for reaching destined locations by traversing traffic in a least time of determining is disclosed. Traffic information and incident information may be received using an input device. The traffic information and the incident information may be used to determine traffic and incidents associated with an area, and successively to determine a correlation score. The correlation score is calculated by analyzing the traffic information and the incident information. Further, an optimal location is determined based on the correlation score, for staging a first responder. Thus, the first responders could reach any of the destined locations in least time, when an incident occurs.

18 Claims, 9 Drawing Sheets

(56) References Cited

U.S. PATENT DOCUMENTS

| | | | |
|---|---|---|---|
| 2016/0117921 A1* | 4/2016 | D'Amato | G07C 5/008 |
| | | | 701/117 |
| 2016/0148140 A1* | 5/2016 | Wu | G06Q 10/06315 |
| | | | 705/7.25 |
| 2017/0161614 A1* | 6/2017 | Mehta | G06N 20/00 |
| 2018/0053401 A1* | 2/2018 | Martin | G08B 29/188 |
| 2018/0096595 A1* | 4/2018 | Janzen | G06K 9/0063 |
| 2018/0211523 A1* | 7/2018 | Ashida | G08G 1/0133 |
| 2019/0147737 A1* | 5/2019 | Madduri | G08G 1/012 |
| | | | 701/117 |

* cited by examiner

OPTIMIZING EMERGENCY SERVICES LOGISTICS USING DATA FROM A SMART TRAFFIC CONTROL SYSTEM

CROSS-REFERENCE TO RELATED APPLICATIONS

The present application claims the priority benefit of U.S. provisional patent application No. 62/664,017 filed Apr. 27, 2018, the disclosure of which is incorporated by reference herein.

BACKGROUND OF THE INVENTION

1. Field of the Disclosure

The present disclosure is generally related to smart traffic control systems, and more particularly related to utilizing traffic control systems data for emergency vehicles.

2. Description of the Related Art

With current trends in suburban development, infrastructure limitations generally result in increasing congestion along routes due to increasing number of vehicles requiring access to urban areas. Additionally, high density housing developments create further congestion, as well as limit access and visibility while driving. This often leaves motorists with limited notice of potential hazards and few options for route adjustment to avoid congested areas. For most road users, this poses little more than an inconvenience.

Emergency vehicles, however, must avoid congested routes or provide appropriate notification to traffic users to clear the desired route for passage of the emergency vehicles. The inherent urgency of emergency vehicle travel necessitates effective notification to other traffic to clear the route as quickly as possible. It has become increasingly difficult to timely notify and navigate congested traffic through urban and suburban areas. It is also generally desirable for emergency vehicles to be able to travel at speeds greater than those permitted for other vehicles. Emergency vehicles travelling at high speeds through congested areas may further pose a risk to all users of the roadway, as well as to individuals seeking emergency assistance, and also increases the response time.

Ever-increasing traffic has been a serious problem faced by emergency vehicle drivers, as travel times may increase considerably due to increased traffic. In peak hours, existing infrastructure fails to cope with the heavy traffic, leading to long traffic congestions. Furthermore, traffic situations may affect movement of the emergency vehicles. The delay introduced due to the traffic congestion may not be desirable.

Thus, there is a need for improved systems and methods for emergency vehicle logistics.

DETAILED DESCRIPTION

Figure 1:
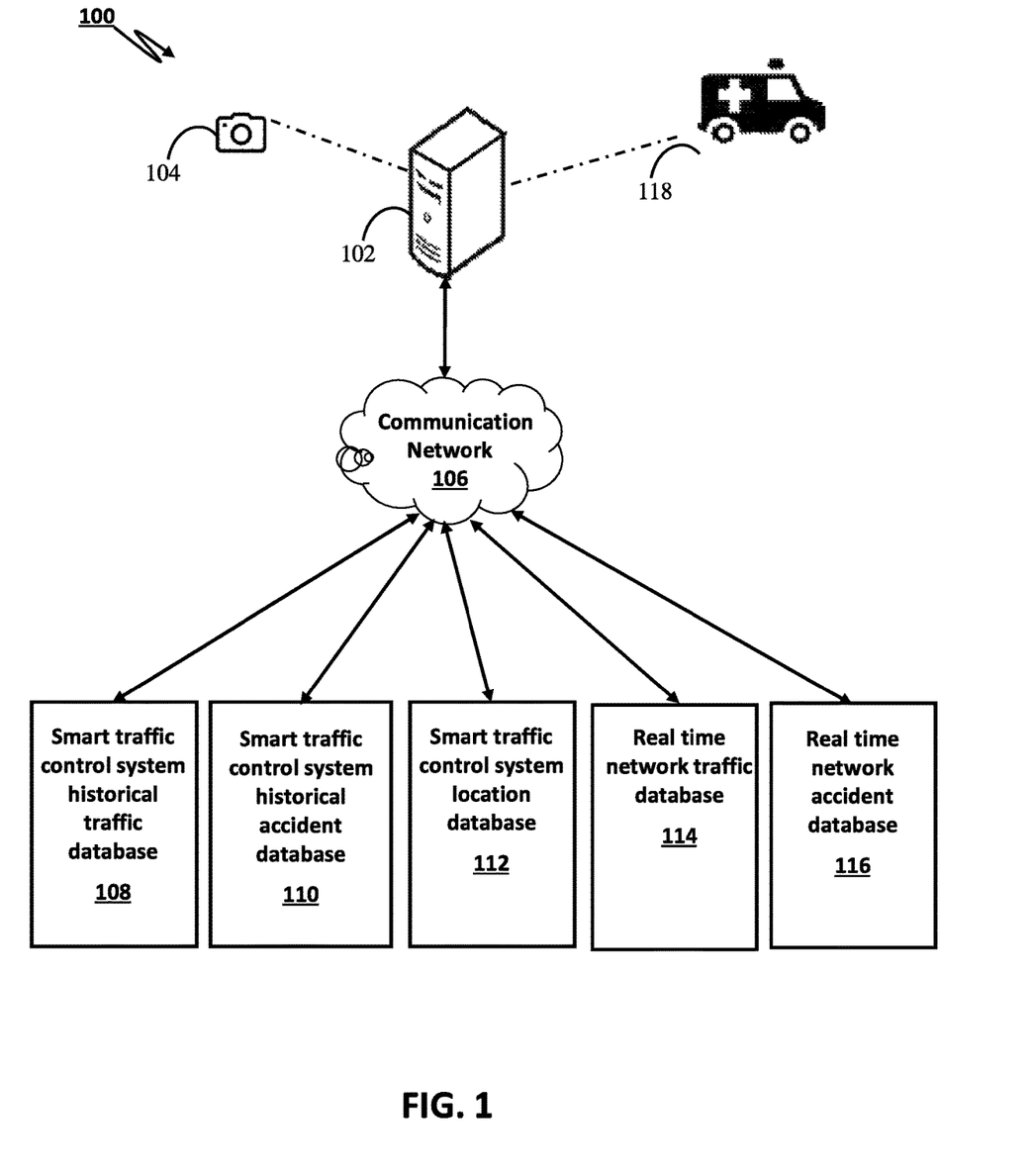
FIG. 1 illustrates an exemplary network environment in which systems for logistical planning for emergency services may be implemented.

FIG. 1 illustrates an exemplary network environment 100 in which systems for logistical planning for emergency services may be implemented. Network environment 100—which may include implementation at a traffic cabinet installed at a roadway or at an application running over a cloud network—may include one or more cameras 104 (inclusive of, traffic monitors and environmental sensors) positioned at several intersections or locations along a roadway. One or more cameras 104 may be located at the intersection, for example.

The smart traffic control system 102 may be connected to a communication network 106. Through the communication network 106, the smart traffic control system 102 may be connected with a smart traffic control system historical traffic database 108, smart traffic control system historical accident database 110, smart traffic control system location database 112, real time network traffic database 114, and a real-time network accident database 116. In addition, the network environment may include an emergency services vehicle 118 capable of wireless communication with smart traffic control system 102.

The communication network 106 may be a wired and/or a wireless network. The communication network 106, if wireless, may be implemented using communication techniques such as Visible Light Communication (VLC), Worldwide Interoperability for Microwave Access (WiMAX), Long Term Evolution (LTE), Wireless Local Area Network (WLAN), Infrared (IR) communication, Public Switched Telephone Network (PSTN), radio waves, and other communication techniques known in the art. In addition, communication network may further include dedicated short range communications (DRSC), which provides for wireless communication with vehicles. Emergency services vehicle 118 may communicate wirelessly using DRSC with other devices in the network environment 100.

Figure 2:
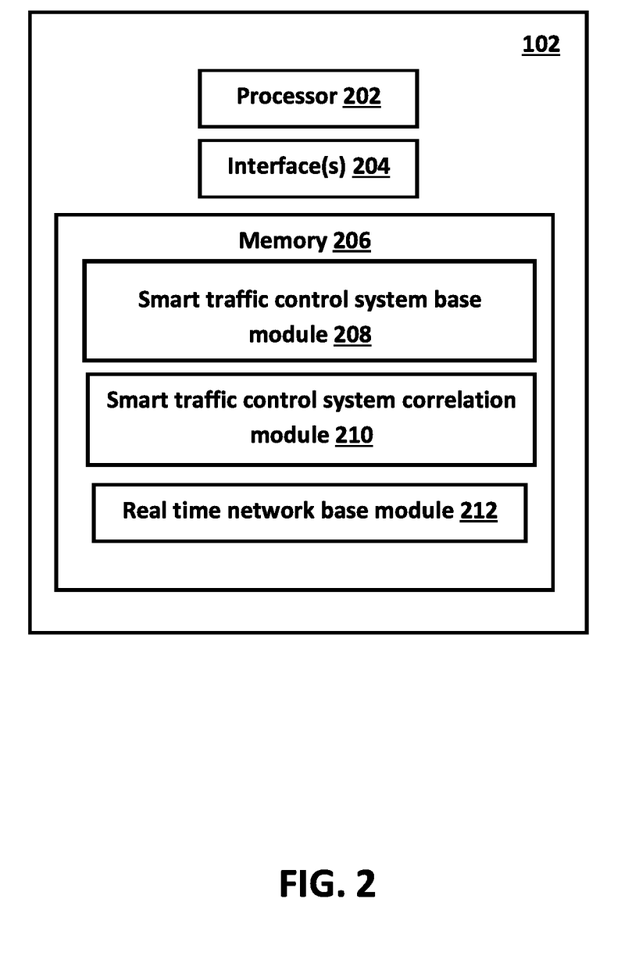
FIG. 2 is a block diagram illustrating an exemplary smart traffic control system.

FIG. 2 is a block diagram illustrating an exemplary smart traffic control system 102 such as illustrated in FIG. 1. The smart traffic system 102 may include a processor 202, one or more interface(s) 204, and a memory 206. The processor 202 may include one or more general-purpose processors (e.g., INTEL® or Advanced Micro Devices® (AMD) microprocessors) and/or one or more special purpose processors (e.g., digital signal processors or Xilinx® System On Chip (SOC) Field Programmable Gate Array (FPGA) processor). The processor 202 may also be configured to decode and execute any instructions received from one or more other electronic devices or server(s). In particular, processor 202 may be configured to execute one or more computer-readable program instructions, such as program instructions to carry out any of the functions described in this description. Such executed instructions may include, for example, an algorithm stored in the memory 206 for determining visual details of an intersection or roadway.

The interface(s) 204 may allow for communications and other interaction data to be received and sent by the smart traffic control system 102. The interface(s) 204 may either be a Command Line Interface (CLI), Graphical User Interface (GUI), or a voice interface.

The memory 206 may include, but is not limited to, fixed (hard) drives, magnetic tape, floppy diskettes, optical disks, Compact Disc Read-Only Memories (CD-ROMs), and magneto-optical disks, semiconductor memories, such as ROMs, Random Access Memories (RAMs), Programmable Read-Only Memories (PROMs), Erasable PROMs (EPROMs), Electrically Erasable PROMs (EEPROMs), flash memory, magnetic or optical cards, or other type of media/machine-readable medium suitable for storing electronic instructions. The memory 206 may comprise modules implemented as a program. In one case, the memory 206 may comprise a smart traffic control base module 208, smart traffic control system correlation module 210, and a real-time network base module 212.

Figure 3:
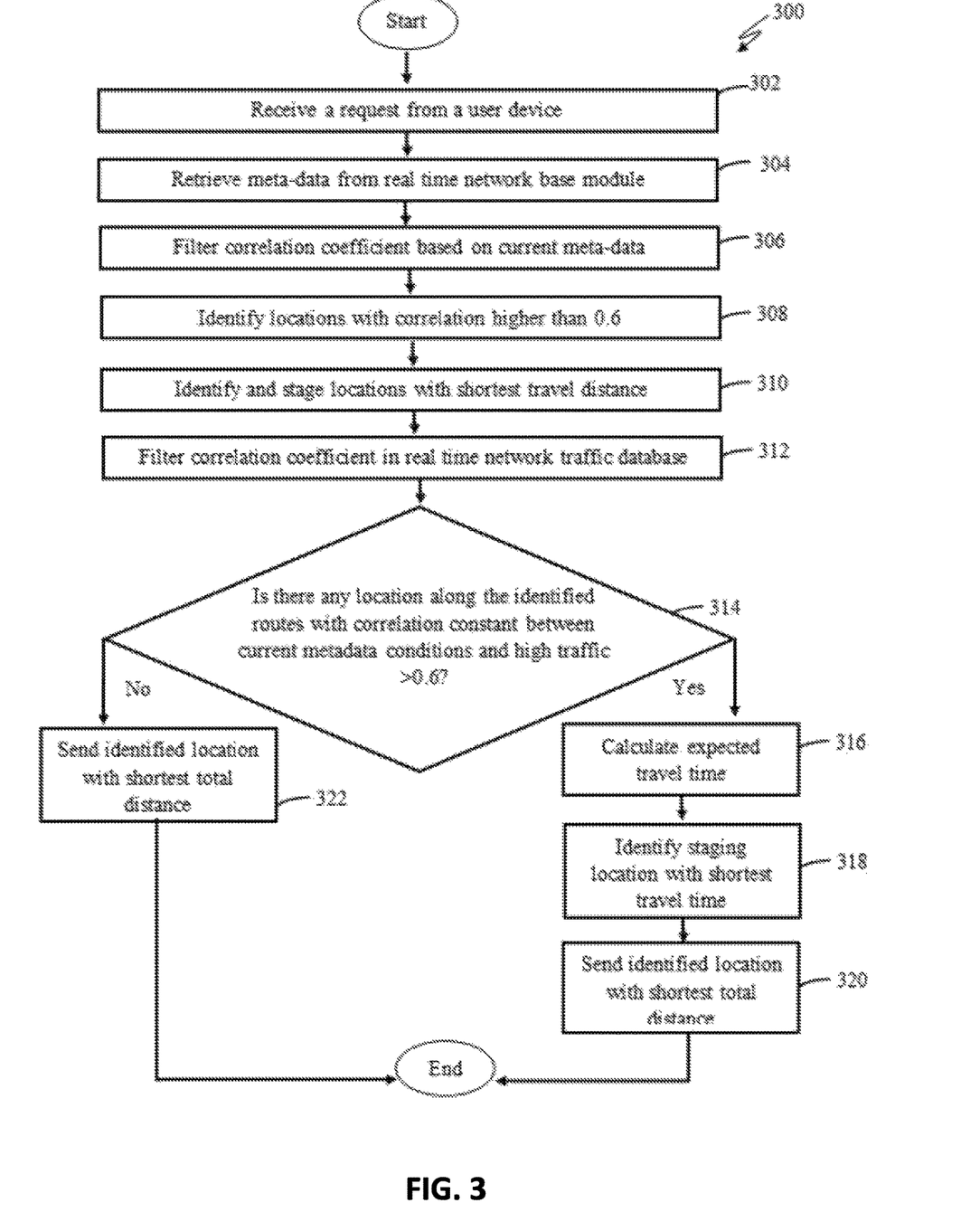
FIG. 3 is a flowchart illustrating an exemplary method for logistical planning for emergency services.

FIG. 3 is a flowchart illustrating an exemplary method for logistical planning for emergency services. One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

In step 320, the smart traffic control system base module 208 may receive a request from a user device (e.g., used by emergency services personnel in emergency service vehicle 118). The request may concern identifying a location to stage a first responder (e.g., emergency services vehicle 118). As such, emergency service vehicle 118 may request smart traffic control system 102 to provide a selected location—based on current data tracked and evaluated by smart traffic control 102—where the emergency services 118 may be stationed.

In step 304, the smart traffic control system base module 208 may successively retrieve data and metadata regarding traffic information and incident information from such sources as the real-time network base module 212. The smart traffic control system base module 208 may receive such information stored in the real-time network traffic database 114 and the real-time network accident database 116. In one embodiment, correlations may be identified and established between traffic information and incident information.

In step 306, correlation coefficients may be filtered based on the retrieved data and metadata regarding traffic and incidents. Further, in step 308, locations that may have a correlation coefficient higher than 0.60 for an incident may be identified.

In step 310, the smart traffic control system base module 208 may thereafter identify and select a stage location for emergency services 118 from among a plurality of available locations. The selection of the stage location may be based on travel distance from a specified location (e.g., reported location(s) of a vehicular accident). The smart traffic control system base module 208 may determine 'n' number of locations where the first responder or emergency services 118 may be staged so as to reach the specified location in the least time. Preferably, a minimum of two locations may be identified and selected to stage the first responder 118, but more stage locations could also be determined.

Figure 4:
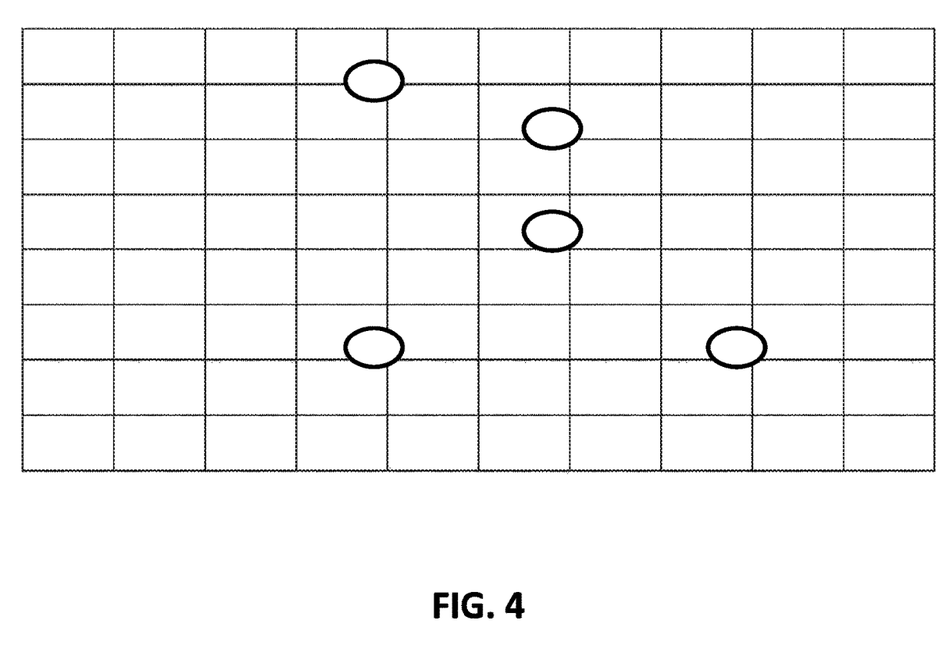
FIG. 4 illustrates an exemplary grid view of an area of roads where an exemplary method for logistical planning for emergency services may be implemented.

FIG. 4 illustrates an exemplary grid view of an area of roads where an exemplary method for logistical planning for emergency services may be implemented. As illustrated in FIG. 4, region A may be identified as the region where emergency services 118 is needed. The smart traffic control system base module 208 may determine locations P and Q with correlation coefficients of 0.87 and 0.92 respectively. Both the locations P and Q may be highly correlated to incidents and may need the first responder 118 in case an accident occurs at any of these locations. The smart traffic control system base module 208 may determine a location M from where the first responder 118 could travel to the locations P and Q in least possible time.

In step 312, the smart traffic control system base module 208 may filter correlation coefficients in the real-time network traffic database 114. In one case, the correlation coefficients may be filtered based on the received traffic information, the incident information, and routes from identified staging locations to the destined locations i.e. identified incident locations.

In step 314, the smart traffic control system base module 208 may determine if there exists a location along an identified route with a value of correlation constant greater than 0.6. In step 316, the correlation coefficient may be found to be greater than 0.6, at which point the smart traffic control system base module 208 may calculate an expected travel time. Thereafter, a staging location with shortest travel time may be identified in step 318. Then in step 320, the identified location—with the shortest total distance between the first responder 118 and the site of the incident—may be sent to the user device.

If step 314 results in finding that the correlation coefficient is found to be less than 0.6, the method may proceed to step 320 where the identified location with the shortest total distance of travel for the first responder 118 to the incident may be sent to the user device.

In one exemplary embodiment as illustrated in FIG. 4, it may be determined that an identified location M has, along its route to location P, an intersection (location X) with a correlation coefficient of 0.88, between the current traffic and incident conditions and traffic situation. The smart traffic control system base module 208 may pick a second location O which may be present at a longer distance than M but having a correlation coefficient of 0.45. The smart traffic control system base module 208 may calculate the travel time for M and O and determines if O is the location with least travel time. The user device may be notified that the first responder 118 may be staged at location O.

Figure 5:
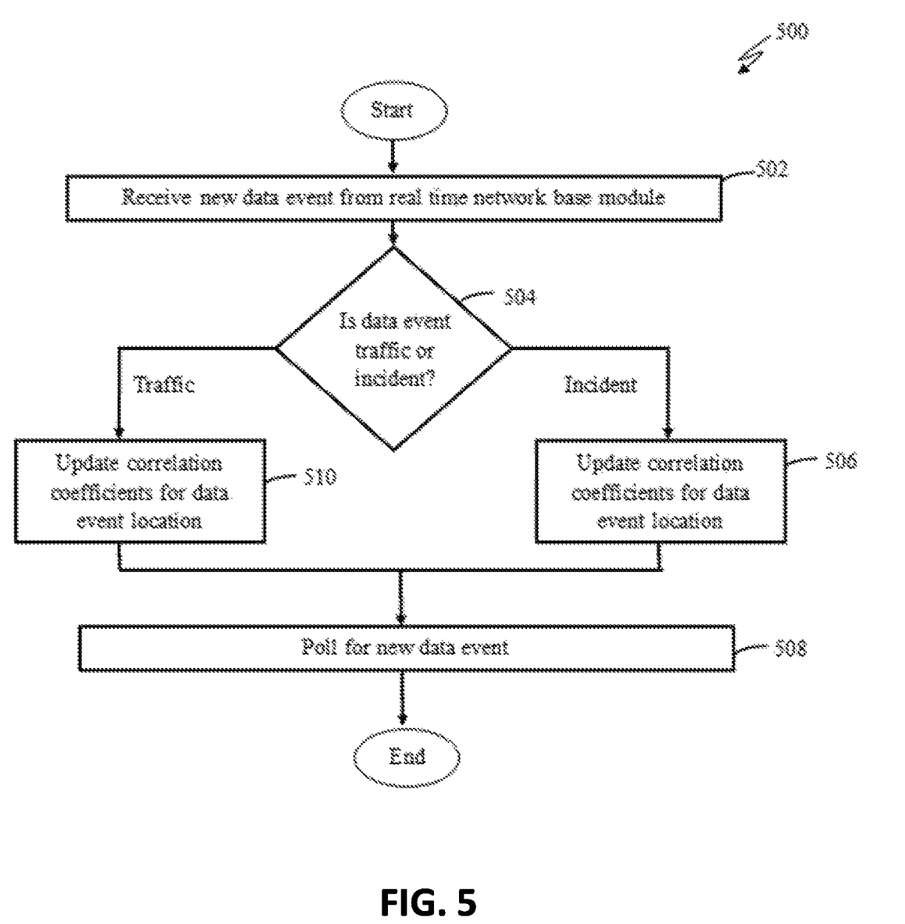
FIG. 5 is a flowchart illustrating an exemplary method for evaluating traffic events around which logistical planning for emergency services may be based.

Functioning of the smart traffic control system correlation module 210 will now be explained with reference to the flowchart 500 shown in FIG. 5. FIG. 5 is a flowchart illustrating an exemplary method 500 for evaluating traffic events around which logistical planning for emergency services may be based. One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

In step 502, the smart traffic control system correlation module 210 may receive data events from the real-time network base module 212. In step 504, the smart traffic control system correlation module 210 may determine whether the data event is a traffic event or an incident event. Where the smart traffic control system correlation module 210 may determine the data event to be a traffic event, the method may proceed to step 510. The traffic data event may be indicative of rainfall, fog, road conditions, day of the week, time of day, local concert or festival, and other similar data events. These data events may be factored by the smart traffic control system correlation module 210 to calculate the correlation coefficients. In step 510, the smart traffic control system correlation module 210 may update the new correlation coefficients for the location of the data event in the smart traffic control system historical traffic database 108.

Where the smart traffic control system correlation module 210 may determine the data event to be an incident event at the step 504, the method may proceed to step 506. In step 506, the smart traffic control system correlation module 210 may update the correlation coefficients for the location of the incident in the smart traffic control system historical accident database 108. Further, the smart traffic control system correlation module 210 may poll for new data events from the real-time network base module 212 in step 508.

Figure 6A:
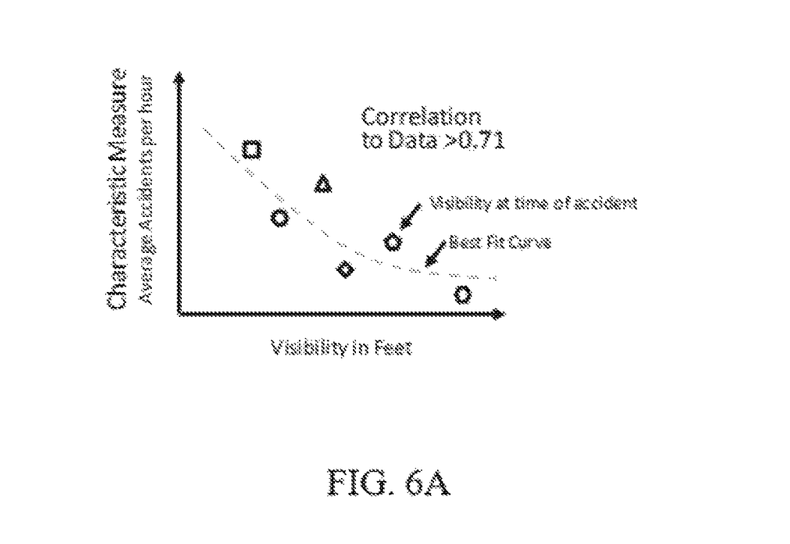
FIG. 6A illustrates an exemplary correlation graph that may be generated between accident average and accident data event due to precipitation.
Figure 6B:
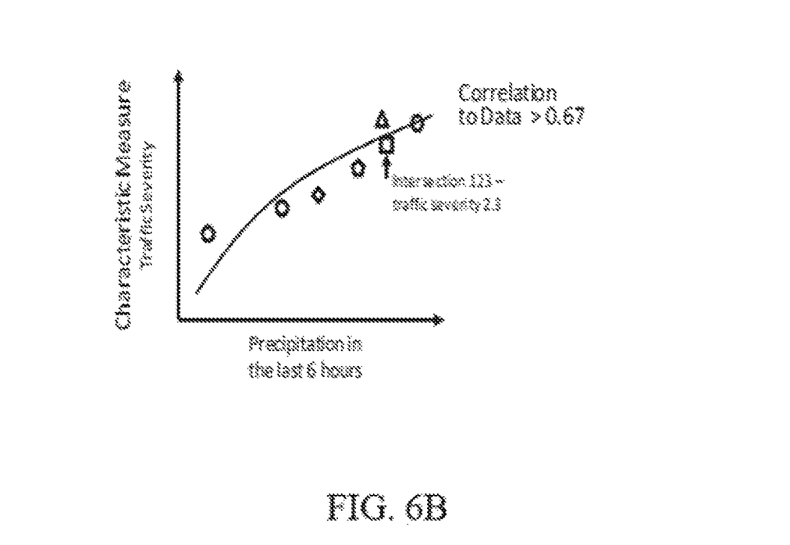
FIG. 6B illustrates an exemplary correlation graph that may be generated between traffic severity and change in traffic event

FIG. 6A illustrates an exemplary correlation graph that may be generated between accident average and accident data event due to precipitation. FIG. 6B illustrates an exemplary correlation graph that may be generated between traffic severity and change in traffic event (e.g., precipitation in past 6 hours).

Figure 7:
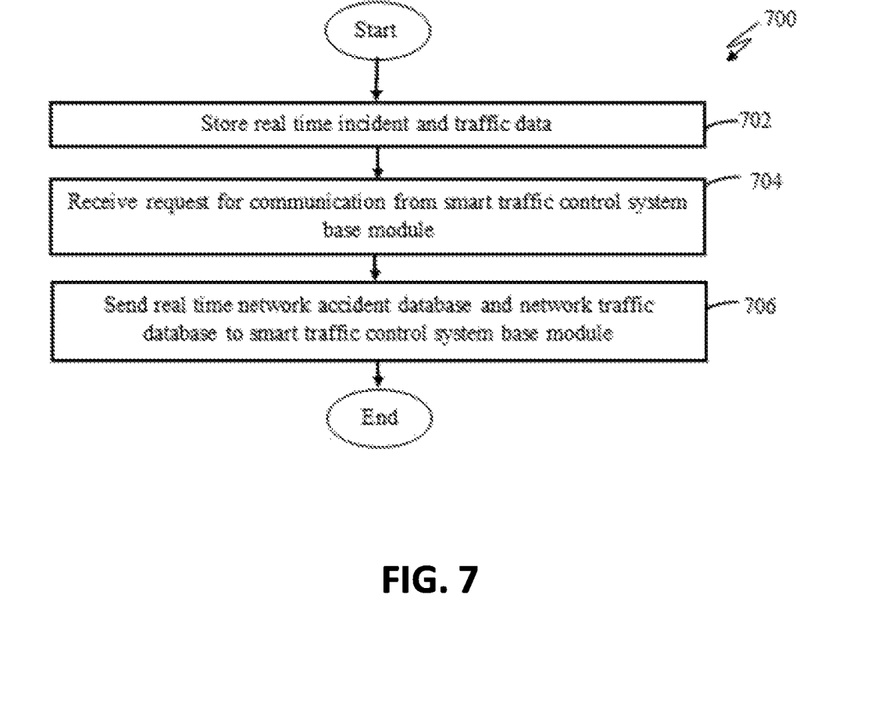
FIG. 7 is a flowchart illustrating an exemplary method for real-time traffic notifications that may be sent as part of logistical planning for emergency services.

Functioning of the real-time network base module 214 will now be explained with reference to the flowchart 700 shown in FIG. 7. FIG. 7 is a flowchart illustrating an exemplary method 700 for real-time traffic notifications that may be sent as part of logistical planning for emergency services. One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

In step 702, the real-time network base module 212 may store the real-time incident and traffic data, and may compile the same on top of the historical incident and traffic data. In step 704, the real-time network base module 212 may continuously receive request from the smart traffic control system base module 208 to establish communication. In step 706, the real-time network base module 212 may accept request and may send real-time network accident database 116 and real-time network traffic database 114 to the smart traffic control system base module 208. The real-time network base module 212 may compile data from various sources, such as network of traffic cabinets, police records, community records, and other related sources.

Figure 8:
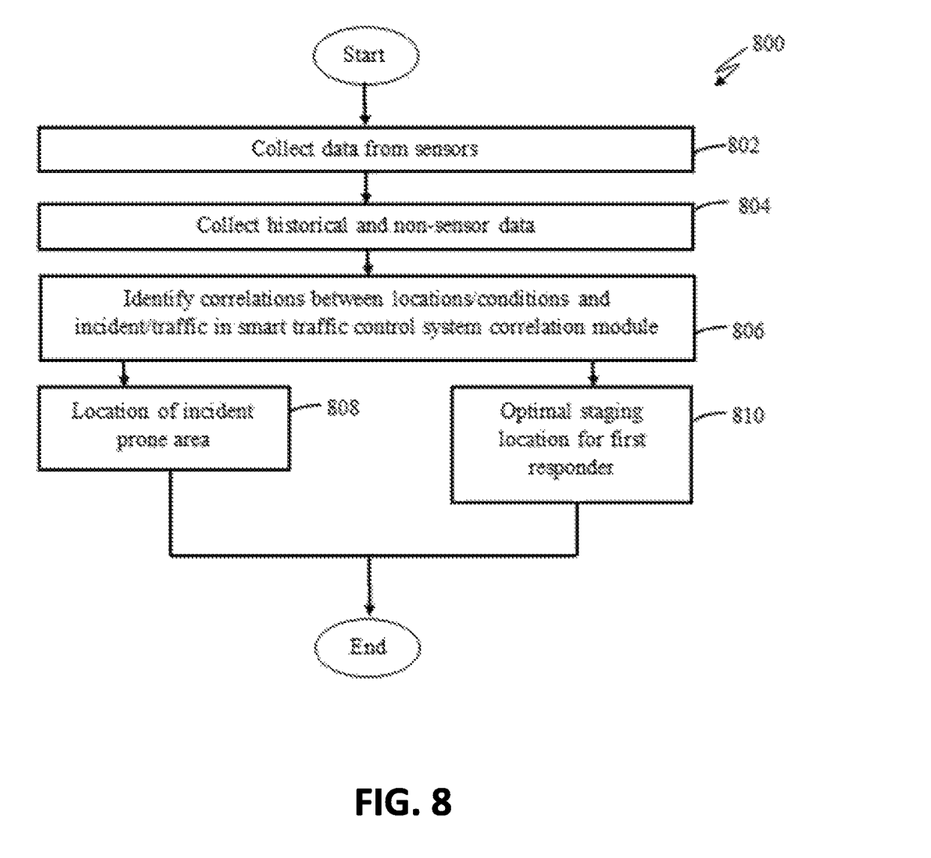
FIG. 8 is a flowchart illustrating an exemplary method for identifying incident prone areas on which logistical planning for emergency services may be based.

The correlation parameters considered for identifying the most incident prone areas, and the optimal staging location for first responder 118 will now be explained with reference to the flowchart 800 shown in FIG. 8. FIG. 8 is a flowchart illustrating an exemplary method 800 for identifying incident prone areas on which logistical planning for emergency services may be based. One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

In step 802, sensor data may be collected from a network of traffic cabinets, environmental sensors, and traffic monitors installed in an area being examined. Other sensors such as optical sensors, humidity sensors, pressure sensors that provide weather condition data may also be used.

In step 804, historical incident related to local events, such as sporting events, concerts, parades, and other non-sensor data may be collected. The historical incident and the traffic data may be collected from the smart traffic control system historical traffic database 108, smart traffic control system historical accident database 110, and local event calendars.

In step 806, the smart traffic control system correlation module 210 may then identify locations and conditions that may be highly correlated with incident or traffic events. Thereafter, location of incident prone areas may be determined in step 808. The incident prone areas may indicate probable areas that may require the first responder 118 in a given time window. The optimal staging location for the first responder 118 may be determined in step 810. The areas highly correlated with traffic may be used to adjust the staging area of the first responder 118, to minimize their travel time to a plurality of incident prone areas.

Table 1 below includes exemplary illustrates data that may be stored in the smart traffic control system historical traffic database 108 for a single traffic signal in region A. Each traffic signal may have its own table of correlation data in the smart traffic control system historical traffic database 108. Column 1 provides correlation ID numbers. Column 2 lists the traffic data event derived from sensors installed on the traffic lights or through external sources. Column 3 lists type of days. Column 4 provides traffic severity based on historical traffic data. The traffic severity may be calculated on a scale of 1 to 3, where 1 indicates low traffic and 3 indicates maximum traffic. Column 5 provides correlation coefficients calculated based on the traffic information and the historical traffic data.

TABLE 1

| Correlation ID | Data Event/Traffic Event | Day Type | Historical Traffic Data - Traffic Severity | Correlation Coefficient |
| --- | --- | --- | --- | --- |
| 1 | Fog | Weekday | 2.1 | 0.781 |
| 2 | Precipitation | Weekend | 3.2 | 0.812 |
| 3 | Baseball Game | Holiday | 3.8 | 0.876 |
| 4 | Precipitation | Weekday | 3.1 | 0.799 |
| 5 | — | Holiday | 1.8 | 0.432 |
| 6 | Flash mob event | Weekday | 4.2 | 0.965 |
| 7 | Precipitation | Weekend | 3.8 | 0.876 |

Table 2, provided below, illustrates exemplary data that may be stored in the smart traffic control system historical accident database 110 for a single traffic signal in region A. Column 1 provides correlation ID numbers. Column 2 lists incident data events. Column 3 lists type of days. Column 4 provides incident frequency based on the historical incident data. Column 5 provides correlation coefficients calculated based on the incident information and the historical incident data.

TABLE 2

| Correlation ID | Data Event/Traffic Event | Day Type | Historical Incident Data - Incident Frequency | Correlation Coefficient |
|---|---|---|---|---|
| 1 | Fog | Weekday | 3.3 | 0.817 |
| 2 | Precipitation | Weekend | 2.8 | 0.695 |
| 3 | Baseball Game | Holiday | 1.4 | 0.432 |
| 4 | Precipitation | Weekday | 3.4 | 0.876 |
| 5 | — | Holiday | 0.5 | 0.232 |
| 6 | Flash mob event | Weekday | 3.8 | 0.889 |
| 7 | Precipitation | Weekend | 4.0 | 0.965 |

Figure 9:
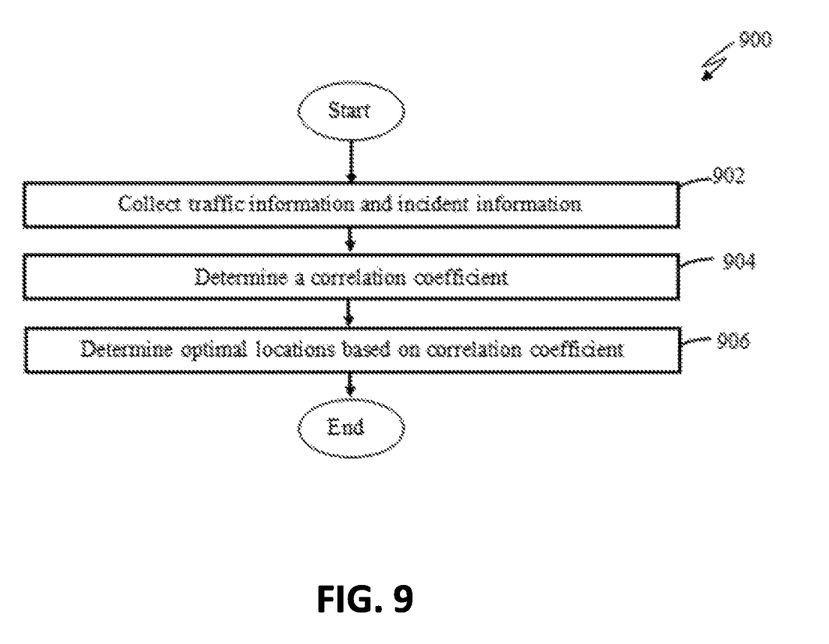
FIG. 9 is a flowchart illustrating an exemplary method for evaluating logistical plans for emergency services.

FIG. 9 is a flowchart illustrating an exemplary method for evaluating logistical plans for emergency services. In this regard, each block may represent a module, segment, or portion of code, which comprises one or more executable instructions for implementing the specified logical function (s). It should also be noted that in some alternative implementations, the functions noted in the blocks may occur out of the order noted in the drawings. For example, two blocks shown in succession in FIG. 9 may, in fact, be executed substantially concurrently or the blocks may sometimes be executed in the reverse order, depending upon the functionality involved. Any process descriptions or blocks in flowcharts should be understood as representing modules, segments, or portions of code which include one or more executable instructions for implementing specific logical functions or steps in the process, and alternate implementations are included within the scope of the example embodiments in which functions may be executed out of order from that shown or discussed, including substantially concurrently or in reverse order, depending on the functionality involved. In addition, the process descriptions or blocks in flow charts should be understood as representing decisions made by a hardware structure such as a state machine.

In step 902, traffic information and incident information may be collected. The smart traffic control system base module 208 may retrieve the traffic information and the incident information from a real-time network base module 212. The smart traffic control system base module 208 may receive the information from the real-time network accident database 116 and may store such data in the smart traffic control system historical accident database 110.

In step 904, a correlation coefficient may be determined. The retrieved traffic information and the incident information may be filtered, and the correlation coefficients may be determined and stored in the real-time network accident database 116. Further, the smart traffic control system base module 208 may identify locations that may have a correlation coefficient higher than 0.60 for an incident based on the received information.

In step 906, an optimal location may be determined based on the correlation coefficient. The optimal location may indicate a location from where it is possible to reach at least two destined locations in least possible time. The destined locations may indicate locations having highest probability of occurrence of incidents.

In some embodiments, smart traffic control system 102 may further determine various traffic and other environmental conditions at or around the selected locations so as to provide for a customized traffic preemption response. Traffic signal preemption generally allows for manipulation of traffic lights to expedite the path of emergency services 118. Different traffic and other environmental conditions may affect, however, whether certain manipulations are successful or detrimental to response times. In an exemplary embodiment, smart traffic control system 102 may evaluate the traffic and other conditions along the path of an emergency services vehicle and apply intelligence to identify what action (e.g., red light or green light) is most likely to reduce travel time.

Embodiments of the present disclosure may be provided as a computer program product, which may include a computer-readable medium tangibly embodying thereon instructions, which may be used to program a computer (or other electronic devices) to perform a process. The computer-readable medium may include, but is not limited to, fixed (hard) drives, magnetic tape, floppy diskettes, optical disks, Compact Disc Read-Only Memories (CD-ROMs), and magneto-optical disks, semiconductor memories, such as ROMs, Random Access Memories (RAMs), Programmable Read-Only Memories (PROMs), Erasable PROMs (EPROMs), Electrically Erasable PROMs (EEPROMs), flash memory, magnetic or optical cards, or other type of media/machine-readable medium suitable for storing electronic instructions (e.g., computer programming code, such as software or firmware). Moreover, embodiments of the present disclosure may also be downloaded as one or more computer program products, wherein the program may be transferred from a remote computer to a requesting computer by way of data signals embodied in a carrier wave or other propagation medium via a communication link (e.g., a modem or network connection).

What is claimed is:

1. A method of logistical planning for emergency services, the method comprising:
storing traffic information and incident information in memory regarding a plurality of locations in a region;
executing instructions stored in the memory, wherein execution of the instructions by a processor:
receives the traffic information and the incident information over a communication network, the traffic information and the incident information captured using at least one of: a traffic cabinet, a traffic camera, a traffic monitor and an environmental sensor;
retrieves data and metadata regarding the traffic information and the incident information;
filters correlation coefficients based on the retrieved data and metadata regarding the traffic information and the incident information;
determines a correlation coefficient from a correlation established between the traffic information and the incident information; and
selects a stage location from among a plurality of candidate locations for a requesting emergency service provider that designates an incident location based on:
the determined correlation coefficient, and
a shortest travel time to the incident location from the stage location;
sending a notification to the requesting emergency service provider regarding the stage location; and
controlling a traffic preemption system based on the stage location.

2. The method of claim 1, wherein the stage location is one of a plurality of candidate locations.

3. The method of claim 2, further comprising identifying the plurality of candidate locations based on filtering a determined correlation coefficient for each of the plurality of candidate locations based on a predetermined threshold.

4. The method of claim 2, further comprising identifying the plurality of candidate locations based on evaluating a determined correlation coefficient for one or more intermediate locations between the requesting emergency service provider and each of the plurality of candidate locations.

5. The method of claim 1, further comprising storing historical data regarding traffic and incidents in the region.

6. The method of claim 1, wherein controlling the traffic preemption system comprises dynamically evaluating one or more conditions affecting travel time, and selecting preemption inputs based on the dynamic evaluation.

7. A system of logistical planning for emergency services, the system comprising:
   memory that stores traffic information and incident information regarding a plurality of locations in a region;
   a processor that executes instructions stored in the memory, wherein execution of the instructions by the processor:
   receives the traffic information and the incident information over a communication network, the traffic information and the incident information captured using at least one of: a traffic cabinet, a traffic camera, a traffic monitor and an environmental sensor;
   retrieves data and metadata regarding the traffic information and the incident information;
   filters correlation coefficients based on the retrieved data and metadata regarding the traffic information and the incident information;
   determines a correlation coefficient from a correlation established between the traffic information and the incident information; and
   selects a stage location from among a plurality of candidate locations for a requesting emergency service provider that designates an incident location based on:
   the determined correlation coefficient, and
   a shortest travel time to the incident location from the stage location;
   a communication interface that sends a notification to the requesting emergency service provider regarding the stage location; and
   a traffic preemption system controlled based on the stage location.

8. The system of claim 7, wherein the stage location is one of a plurality of candidate locations.

9. The system of claim 8, wherein the processor executes further instructions to identify the plurality of candidate locations based on filtering a determined correlation coefficient for each of the plurality of candidate locations based on a predetermined threshold.

10. The system of claim 8, wherein the processor executes further instructions to identify the plurality of candidate locations based on evaluating a determined correlation coefficient for one or more intermediate locations between the requesting emergency service provider and each of the plurality of candidate locations.

11. The system of claim 7, wherein the memory further stores historical data regarding traffic and incidents in the region.

12. The system of claim 7, wherein the processor controls the traffic preemption system by dynamically evaluating one or more conditions affecting travel time, and selecting preemption inputs based on the dynamic evaluation.

13. A non-transitory computer-readable storage medium, having embodied thereon a program executable by a processor to perform a method of logistical planning for emergency services, the method comprising:
   storing traffic information and incident information in memory regarding a plurality of locations in a region;
   receiving the traffic information and the incident information, wherein the traffic information and the incident information is captured using at least one of: a traffic cabinet, a traffic camera, a traffic monitor and an environmental sensor;
   retrieving data and metadata regarding the traffic information and the incident information;
   filtering correlation coefficients based on the retrieved data and metadata regarding the traffic information and the incident information;
   determining a correlation coefficient from a correlation established between the traffic information and the incident information;
   selecting a stage location from among a plurality of candidate locations for a requesting emergency service provider that designates an incident location based on:
   the determined correlation coefficient, and
   a shortest travel time to the incident location from the stage location;
   sending a notification to the requesting emergency service provider regarding the stage location; and
   controlling a traffic preemption system based on the stage location.

14. The method of claim 13, wherein the stage location is one of a plurality of candidate locations.

15. The method of claim 14, further comprising identifying the plurality of candidate locations based on filtering a determined correlation coefficient for each of the plurality of candidate locations based on a predetermined threshold.

16. The method of claim 14, further comprising identifying the plurality of candidate locations based on evaluating a determined correlation coefficient for one or more intermediate locations between the requesting emergency service provider and each of the plurality of candidate locations.

17. The method of claim 13, further comprising storing historical data regarding traffic and incidents in the region.

18. The method of claim 13, wherein controlling the traffic preemption system comprises dynamically evaluating one or more conditions affecting travel time, and selecting preemption inputs based on the dynamic evaluation.

* * * * *